United States Patent Office 3,634,298
Patented Jan. 11, 1972

3,634,298
HIGH GLOSS PAPER COATING COMPOSITION OF A LATEX INTERPOLYMER OF ALKYL ACRYLATE-MONOVINYL AROMATIC-UNSATURATED CARBOXYLIC ACID-ACRYLONITRILE
Robert Alan Wamsley, Anchorage, John Edward Barnett, Pleasure Ridge Park, and Kenneth Ralph Rose and Gerald Stephan Jones, Louisville, Ky., assignors to Celanese Coatings Company, New York, N.Y.
No Drawing. Filed Apr. 11, 1969, Ser. No. 816,186
Int. Cl. C08f 29/54; D21h 1/28
U.S. Cl. 260—29.6 TA                    6 Claims

ABSTRACT OF THE DISCLOSURE

High gloss papers are produced by coating the paper with a composition made from a major amount of pigment and a minor amount of a binder wherein the binder is a latex interpolymer of an alkyl acrylate or methacrylate, a vinyl aromatic compound, a polymerizable acid and acrylonitrile.

BACKGROUND OF THE INVENTION

This invention pertains to paper coated with pigments and synthetic resins. In particular this invention is directed at paper coatings made from pigments and synthetic polymeric latices.

Paper is coated to improve printability, appearance, water resistance and other properties. Paper coatings generally contain a major proportion of pigments, such as clay, and a minor proportion of binder. Such coatings generally have a honeycomb like structure with the binder contained in the pigment voids. Important properties of a paper coating are strength (pick resistance), printing ink receptivity and holdout, and optical properties such as gloss, brightness and opacity.

The gloss of a paper coating is primarily a function of the pigment and the smoothness of the coating. A higher gloss is generally obtained with "plate" pigments, such as kaolin clay. The gloss of coated paper can be increased by calendering wherein the sheets of paper are smoothed and the clay platelets are oriented longitudinally to the paper surface. Theoretically, the highest gloss should be obtained from a 100% coating of clay platelets, since nothing will interfere with the movement and orientation of the platelets. However, such a 100% pigment coating will not adhere to the paper and various binders are used to hold the pigment in place. Starch and protein solution binders, which were used extensively in the past, give low gloss coatings. Somewhat higher gloss coatings have been obtained using synthetic polymeric latices as the binder.

In the paper coating process, the coating is applied in an aqueous medium. The pigment is oriented during the drying cycle by surface tension effects which bring the pigment to minimum volume. This is also the point of maximum orientation and highest gloss. Binders, however, freeze the pigment in a random orientation as soon as pigment binding occurs preventing maximum orientation and gloss. Latex binders do not bind the pigment until the emulsion is broken in the drying cycle and film formation occurs. As the minimum film forming temperature is increased, the time until coalescence in drying is increased, thereby increasing the time for orientation to occur. Orientation of the pigment, therefore, is a function of the glass transition temperature ($T_G$) of the binder. If the $T_G$ is low, film formation occurs early in the drying cycle before complete orientation takes place. If the $T_G$ is too high, film formation during the drying cycle does not occur, the binder is not coalesced and does not hold the pigment in place. However, the properties of a good pigment binder are not dependent entirely upon the $T_G$. The binder must also be of the proper composition as not to adversely affect the strength properties, ink and varnish holdout, water resistance and the like.

SUMMARY OF THE INVENTION

By this invention coated papers are produced which have high gloss, excellent strength properties, ink and varnish holdout and water resistance. The coating compositions of this invention are made from an aqueous suspension of a major amount of pigments and a minor amount of binder, wherein the binder is an aqueous latex interpolymer of 33 to 70 weight percent alkyl acrylate or methacrylate ester, said alkyl group containing 1 to 4 carbon atoms, 20–50 weight percent vinyl aromatic monomer, 0.5 to 2 weight percent alpha, beta unsaturated polymerizable acid, and 5 to 15 weight percent acrylonitrile, said weight percents being based on the total weight of the interpolymer.

By utilizing in the coating compositions of this invention latex interpolymers which contain at least 5 weight percent copolymerized acrylonitrile, coated papers have been made which have not only high gloss, but excellent pick resistance, ink and varnish holdout and water resistance. A coated paper which has a high gloss but is lacking in the other properties is not commercially acceptable.

DESCRIPTION OF THE INVENTION

The pigments which are used in this invention are finely divided materials which are predominantly mineral in character but may be partly organic. As used in this invention, at least about 50 percent up to 100 percent of the pigments are those which are commonly referred to as clays, especially the kaolin type clays. However, other materials such as calcium carbonate and titanium dioxide, and minor amounts of talc, blanc fixe, ochre, carbon black, aluminum powder and the like, can be used in admixture with the clays. The pigment or pigment mixture is preferably dispersed in water using a dispersing aid, such as tetrasodium pyrophosphate.

The aqueous latices used in this invention are obtained by the emulsion polymerization of at least one monomer from each of four classes. One class of monomers are alkyl acrylates or methacrylates wherein the alkyl group contains 1 to 4 carbon atoms. Examples of such monomers are methyl, ethyl, isopropyl and butyl acrylate and methacrylate. The preferred monomers are the alkyl acrylates with the most preferred monomer being methyl acrylate.

Another class of monomers used to make the interpolymers are vinyl aromatic compounds, exemplified by styrene, vinyl toluene, alpha methyl styrene, ortho, meta and para chloro and bromo styrene and the like. The preferred vinyl aromatic compound is styrene.

Still another class of monomers are the alpha, beta unsaturated polymerizable acids, such as acrylic acid, methacrylic acid, crotonic acid, itaconic acid, fumaric acid, maleic acid or anhydride, and mesaconic acid. The preferred acids are those acids which contain 3 to 5 carbon atoms with the most preferred being acrylic or methacrylic acid.

The fourth monomeric constituent is acrylonitrile.

The monomers are polymerized in the weight proportions, based on the total weight of interpolymer, of about 33 to about 70 weight percent alkyl acrylate or methacrylate, about 20 to about 50 weight percent vinyl aromatic compound, about 0.5 to about 2 weight percent polymerizable acid and about 5 to about 15 weight percent acrylonitrile. These amounts are adjusted within the specified quantities in order to obtain interpolymers having calculated glass transition temperatures with the range of about 85° to 110° F. and preferably 90° to 95° F.

In preparing the latices used in this invention, the monomers are dispersed in water using anionic surfactants or a mixture of anionic and nonionic surfactants, examples of which include sulfate esters of alkyl phenoxy polyoxyalkylene alkanols, alkyl aryl sulfonates, alkali metal salts of the sulfates and sulfonates, fatty acid soaps, polyether alcohols and the like. Specific examples of such surfactants are nonyl phenyl polyoxyethylene sulfate, sodium lauryl sulfate, and nonyl phenyl polyoxyethylene ethanol which are presented for illustration only and not for limitation. Such emulsifiers are used in the amounts of at least about 2.75 weight percent based on the total weight of monomers, the preferred amounts being from about 3 weight percent to about 4.5 weight percent.

Catalysts used in polymerizing the dispersed monomers are the well known free-radical producing catalysts, such as hydrogen peroxide, ammonium persulfate, potassium persulfate, and redox catalyst systems wherein reducing agents, such as sodium meta bisulfite are used in combination with oxidizing agents as those above. Such catalyst systems which are used in emulsion polymerization are well known in the art and will not be dealt with in detail.

The polymerization reaction can be carried out by introducing all the monomers into the reactor with the water, emulsifiers and catalyst before starting the reaction, by gradual addition of the monomers during the reaction, or by pre-emulsifying the monomers in a part of the water and adding this pre-emulsion to the remaining water, and catalyst. The last process is the preferred process. The temperature at which the polymerization can be conducted is from the freezing point of water to the boiling point, the preferred temperatures, however, being about 100° F. to about 200° F. with the most preferred being about 140° F. to about 160° F. The pH during the polymerization reaction is generally below 7, but after the polymerization is completed, the pH is generally adjusted to 6 to 10 with a base, preferably ammonium hydroxide.

In the preferred process for preparing the latices of this invention, the monomers are pre-emulsified in water using anionic or a mixture of anionic and nonionic surfactants as hereinbefore described. The amount of water used in the pre-emulsion will vary depending upon the desired solids content, viscosity and particle size of the latices. Generally, about 10 to about 75 weight percent water based on the total weight of monomers is used, with the preferred amount being about 30 to about 50 weight percent. This pre-emulsion is then gradually introduced into a reactor which contains an additional amount of water, sufficient to adjust the latex to the desired final solids content and sufficient to dissolve the free radical catalyst and activator if used. Alternately the pre-emulsion can be introduced into the reactor by gradual addition along with the aqueous solutions of free radical catalyst and activator. The pre-emulsion is added at such a rate that the monomers are substantially polymerized as added.

The latices have a solids content of about 40 to about 70 percent and a preferred particle size of about 0.05 to about 0.25 micron.

The pigments and latices are combined using any suitable mixing means to form the coating composition. For example, the pigment can be dispersed in water using a high speed mixer in the amount of about 100 parts by weight of pigment to 40 to 100 parts by weight of water to form a smooth dispersion, referred to in the art as a "clay slip." 0.05 to about 0.3 part by weight of a dispersing aid, e.g., tetrasodium pyrophosphate, can be used to aid in dispersing the pigment. The latex is then mixed under high speed agitation with the clay slip, the pigments and the latex, on a dry basis, being in the weight ratio of 90 to 70 parts pigment to 10 to 30 parts binder, the total being 100. Additional water can be added to adjust the viscosity to a desired consistency, and the pH is adjusted to 8–9 with a base.

The coating composition is applied to paper, paperboard or other cellulosic substrate using any suitable means, examples of which are immersion roll and doctor system, gravure roller system, brush coater, trailing blade coated, air knife coater, or spray coater. The coated paper is dried by any convenient method but such drying often is accomplished by causing a current of air at a velocity of up to 10,000 feet per minute to impinge on the surface of the coated paper. The temperature of the air may vary up to 600° F., but the duration of contact with the coating is such that the coating is not heated above 250° F. After drying the coated paper can be calendered and then printed.

The following examples are used to described the compositions of this invention in greater detail. Parts and percentages where used are parts and percentages by weight.

EXAMPLE 1

To a suitable reaction vessel equipped with a thermometer, mechanical agitator and three addition funnels were added 730 parts of water. To one addition funnel were added 931 parts of methyl acrylate, 266 parts of styrene, 119.7 parts of acrylonitrile and 13.2 parts of methacrylic acid to a mixture of 500 parts of water and 103.6 parts of anionic surfactant—nonylphenyl oxyethylene sulfate at 46% solids in water. A pre-emulsion was formed by agitating the monomer, water, surfactant mixture for 30 minutes. A catalyst solution made up of 3.0 parts of potasisum persulfate in 150 parts of water was added to the second funnel. An activator solution formed from 3.0 parts of sodium meta bisulfite in 150 parts of water was added to the third funnel.

The temperature of the water in the reactor was raised to 140° F. and separate but concurrent additions from each of the addition funnels was begun. The pre-emulsion was added over a 2.5 hour period, and the catalyst and activator solutions were added over a 2.75 hour period while maintaining temperature of 140° F. to 150° F. and an agitation rate of 150 to 200 r.p.m. The temperature of 140° F. to 150° F. was maintained for about 45 minutes after all the components had been added to complete the polymerization reaction. To the latex was added 9 parts of ammonium hydroxide (14% ammonia in water) to adjust the pH of the latex to 8.5. The resulting product had a viscosity of 30 cps. at 25° C., a solids content of 45.7% and a weight per gallon of 8.9 lbs.

To a suitable vessel 3000 parts of high gloss kaolin clay were added along with 1290 parts of water and 24 parts of tetrasodium pyrophosphate. This mixture was agitated on a high speed (Cowles) mixer until a minimum viscosity was obtained. 715 parts of the resulting clay slip were then added to a high speed mixer along with 217 parts of the latex prepared above, 5 parts of aluminum stearate and 103 parts of water. After 10 minutes a homogeneous mixture was obtained which was adjusted to a pH of 8.5 with 4 ml. of 28% ammonium hydroxide.

The resulting paper coating was drawn down on 13 point carton stock with a number 9 wire wound Meyer bar. The coated paper was dried for 1 minute at 300° F. and was then placed in a calender stack and subjected to a temperature of 190° F.–200° F. and a pressure of 350 lbs. per linear inch.

EXAMPLE 2

Utilizing a method similar to that of Example 1, a latex copolymer of 700 parts of methyl acrylate, 10 parts of methacrylic acid, 50 parts of acrylonitrile and 240 parts of styrene was prepared. When the reaction was completed the resulting aqueous emulsion had a viscosity of 25 cps. at 25° C., a solids contents of 45.4% and a weight per gallon of 9.01 lbs.

Using the same procedure as described in Example 1, a paper coating was prepared. This coating was then used to coat paper stock exactly as was described in Example 1.

EXAMPLE 3

A standard vinyl acetate copolymer emulsion was prepared by the emulsion polymerization of 890 parts of vinyl acetate, 100 parts of ethyl acrylate and 10 parts of maleic anhydride. After the reaction was completed, the latex had a viscosity of 275 cps. at 25° C., a solids content of 46.0% and a weight per gallon of 9.05 lbs.

A paper coating composition was prepared and paper was coated with this composition using the procedure described in Example 1.

The paper coatings prepared in Examples 1–3 were evaluated using the following tests:

Base gloss

Gloss readings of the paper coatings were determined using a photovolt glossmeter, standardized against a glass plate of known gloss. Gloss readings were taken at incidence angles of 20° and 75° from the vertical plane, the readings being expressed as percentage of total reflections as compared with the glass standard.

K and N ink penetration

This test was performed according to the Technical Association of the Pulp and Paper Industry (TAPPI) test No. RC 19. Results are reported as the brightness drop of the paper samples before and after treatment.

Ink hold-out

This test was performed by printing onto the coated papers a 6 x 6 inch square of a particular ink, e.g., Black Varnish Ink and Blue Gloss Ink. The inks were applied by the method described in TAPPI test number RC313 using a standard Vandercook proof press. The gloss of the inked samples was determined as described above at a 75° incidence angle.

I.G.T. dry pick

This test was performed using a standard I.G.T. pick tester. A coated paper was brought in contact with an inking wheel which was coated with a standard tack ink. The wheel was continuously accelerated until a portion of the paper coating had been lifted or picked. The results of the test are given as velocity in feet per second of the inking wheel.

I.G.T. wet pick

In a modification of the dry pick test, a thin layer of water was applied to the coated paper prior to bringing it into contact with the inking wheel which was then accelerated until the paper coating was picked. Wet pick is measured on a scale of 1 to 5 with 1 being the best and 5 the worst.

The evaluation of the coated papers of Examples 1–3 are given in Table I.

TABLE I

| Example | 1 | 2 | 3 |
|---|---|---|---|
| Composition: | | | |
| Methyl acrylate, percent | 70 | 70 | |
| Styrene, percent | 20 | 24 | |
| Acrylonitrile, percent | 9 | 5 | |
| Methacrylic acid, percent | 1 | 1 | |
| Vinyl acetate, percent | | | 89 |
| Ethyl acrylate, percent | | | 10 |
| Maleic anhydride, percent | | | 1 |
| Calculated $T_G$, °F | 91.5 | 91 | 65 |
| Test results: | | | |
| Base gloss, calendered 75° | 57 | 53 | 38 |
| Base gloss, calendered 20° | 27 | 28 | 14 |
| K & N ink penetration brightness drop | 31.2 | 32.6 | 26.9 |
| Ink hold-out: | | | |
| Blue ink, percent gloss | 78 | 71 | 80 |
| Varnish ink, percent gloss | 81 | 78 | 78 |
| Dry pick, ft./min | 550 | 545 | 535 |
| Wet pick | 1 | 2 | 1–2 |

In Table I papers coated with the compositions of this invention, Examples 1 and 2, are compared with paper coated with a standard commercially used composition. In these tests, paper from the same stock is used, the test samples are prepared at about the same time and the tests are run under the same conditions at about the same time. As can be seen from these tests, the gloss of Examples 1 and 2 is quite superior to that of the standard. Example 1, and Example 2 to a lesser extent, demonstrates a good balance between ink penetration or ink receptivity and ink holdout. Examples 1 and 2 are somewhat better than Example 3 in dry pick resistance, and in wet pick resistance Example 3 lies between Examples 1 and 2.

Another series of coated papers were tested and evaluated, wherein the latices, coating compositions and coated papers were made as described in Example 1. The results of these tests are given in Table II.

TABLE II

| Example | 4 | 5 | 6 | 7 |
|---|---|---|---|---|
| Composition: | | | | |
| Methyl acrylate | 70 | 70 | 70 | 70 |
| Styrene | 26 | 24 | 22 | 20 |
| Acrylonitrile | 3 | 5 | 7 | 9 |
| Methacrylic acid | 1 | 1 | 1 | 1 |
| Calculated $T_G$, °F | 90 | 91 | 92 | 91.5 |
| Test results: | | | | |
| Initial gloss, 75° | 30 | 28 | 26 | 27 |
| Calendered gloss, 75° | 55 | 56 | 56 | 57 |
| K & N ink penetration brightness drop | 32.2 | 32.6 | 30.5 | 30.2 |
| Ink hold-out: | | | | |
| Blue ink, percent gloss | 78 | 78 | 78 | 78 |
| Varnish ink, percent gloss | 79 | 81 | 81 | 81 |
| Dry pick, ft./min | 515 | 545 | 595 | 585 |
| Wet pick | 3 | 2 | 1 | 1 |

This table demonstrates the improvements in overall coating properties which are obtained with increasing amounts of copolymerized acrylonitrile. Example 4 which has only 3% copolymerized acrylonitrile, has very poor wet and dry pick resistance when compared with the compositions containing higher amounts of acrylonitrile.

Another series of coated papers were tested and evaluated, wherein the latices, coating compositions and coated papers were made as described in Example 1. These results are described in Table III.

TABLE III

| Example | 8 | 9 | 10* |
|---|---|---|---|
| Composition: | | | |
| Methyl acrylate, percent | 70 | 69 | 59 |
| Styrene, percent | 20 | 30 | 40 |
| Methacrylic acid, percent | 1 | 1 | 1 |
| Acrylonitrile, percent | 9 | | |
| Calculated $T_G$, °F | 91.5 | 90 | 105 |
| Test results: | | | |
| Initial gloss, 75°, percent | 26 | 28 | 27 |
| Calendered gloss, 75°, percent | 62 | 64 | 56 |
| K & N ink penetration brightness drop | 21.3 | 26.8 | 28.2 |
| Ink hold-out: | | | |
| Blue ink, percent gloss | 84 | 62 | 72 |
| Varnish ink, percent gloss | 80 | 74 | 76 |
| Dry pick, ft./min | 744+ | 744+ | 744+ |
| Wet pick | 1 | 3 | 2 |

*Example 10 showed indications of incomplete coalescence during calendering by giving slight sticking on the stack.

As can be seen from the data listed in Table III, superior overall tests results are obtained from paper coated with the composition of this invention, Example 8, as compared with similar compositions which contain no acrylonitrile and which have about the same $T_G$ respectively.

It is to be understood that the foregoing detailed description is given merely by way of illustration and that many variations may be made therein without departing from the spirit of the invention.

The embodiments of the invention in which an exclusive property or privilege is claimed are defined as follows:

1. A paper coating composition which comprises a suspension in an aqueous medium of pigments and a binder in the weight ratio of about 90 to 70 parts of pigments to 10 to 30 parts of binder solids, the total being 100, wherein the pigments contains at least about 50 weight percent clay and wherein the binder is a latex interpolymer of 33 to 70 weight percent alkyl acrylate or methacrylate ester, said alkyl group containing 1 to 4 carbon atoms, 20 to 50 weight percent monovinyl aromatic compound,
0.2 to 2 weight percent alpha, beta unsaturated polymerizable carboxylic acid containing from 3 to 5 carbon atoms and from 1 to 2 carboxy groups, and
5 to 15 weight percent acrylonitrile, said weight percents being based on the total weight of binder solids.

2. The composition of claim 1 wherein the ester is an alkyl acrylate.

3. The composition of claim 1 wherein the vinyl aromatic compound is styrene.

4. The composition of claim 1 wherein the acid is methacrylic acid.

5. The composition of claim 1 wherein the $T_G$ of the interpolymer is 85° F. to 110° F.

6. The composition of claim 1 wherein the binder is a latex interpolymer of 70 weight percent methyl acrylate, 20 to 24 weight percent styrene, 1 weight percent methacrylic acid and 5 to 9 weight percent acrylonitrile.

References Cited

UNITED STATES PATENTS

| 2,767,153 | 10/1956 | Sutton | 260—29.6 TA |
| 2,889,299 | 6/1959 | Ritson | 260—29.6 TA |
| 3,297,615 | 1/1967 | Frazier, et al. | 260—29.6 TA |
| 2,790,735 | 4/1957 | McLaughlin et al. | 260—29.6 TA |

WILLIAM H. SHORT, Primary Examiner

L. M. PHYNES, Assistant Examiner

U.S. Cl. X.R.

260—41 R, 78.5 N, 80.81, 86.7